United States Patent
Nakanishi et al.

(10) Patent No.: US 6,756,577 B2
(45) Date of Patent: Jun. 29, 2004

(54) LIGHT DETECTOR AND LIGHT DETECTING IC THEREFOR

(75) Inventors: Hiroaki Nakanishi, Kyoto (JP); Susumu Mizuhara, Kyoto (JP)

(73) Assignee: Omron Corporation, Kyoto (JP)

( * ) Notice: Subject to any disclaimer, the term of this patent is extended or adjusted under 35 U.S.C. 154(b) by 276 days.

(21) Appl. No.: 09/994,372

(22) Filed: Nov. 26, 2001

(65) Prior Publication Data

US 2002/0074482 A1 Jun. 20, 2002

(30) Foreign Application Priority Data

Nov. 27, 2000 (JP) ........................................ 2000-359988

(51) Int. Cl.[7] .............................................. H01J 40/14
(52) U.S. Cl. ............................. 250/214 R; 250/214 LS
(58) Field of Search ........................ 250/214 R, 214 A, 250/214 LA, 214 LS, 221, 559.38, 206.1; 327/514, 515; 356/3, 4.01

(56) References Cited

U.S. PATENT DOCUMENTS 5,013,904 A * 5/1991 Muro ...................... 250/214 R 5,701,187 A * 12/1997 Uchio et al. ................. 398/212

* cited by examiner

Primary Examiner—Kevin Pyo
(74) Attorney, Agent, or Firm—Beyer Weaver & Thomas LLP

(57) ABSTRACT

A light detecting IC has a single light receiving element, a first signal processing circuit for processing signals outputted from this light receiving element, a pair of input terminals for receiving signals from outside, a second signal processing circuit for processing signals received from outside through the input terminals, and a switch circuit for selecting one from these two signal processing circuits and outputting results of processing by the selected signal processing circuit. A divided photodiode with two light receiving elements may be connected to the input terminals. Alternatively, another light receiving element which has a larger light receiving surface than the single light receiving element installed on the IC may be connected to one of the pair of input terminals.

14 Claims, 9 Drawing Sheets

LIGHT DETECTOR AND LIGHT DETECTING IC THEREFOR

BACKGROUND OF THE INVENTION

This invention relates to a light detector such as a photoelectric switch and a light detecting IC used therefor.

Photoelectric switches of a type using an IC loaded with a light receiving element and a processing circuit therefor have been known. Such an IC will be hereinafter referred to as light detecting IC. FIG. 11 shows the structure of a conventional photoelectric switch of the so-called reflection type using a light detector 75 having a printed circuit board 74 loaded with a light emitter 73 provided with an LED 72 and a light detecting IC 70. Numeral 76 indicates a casing which constitutes the main body of the photoelectric switch. Numerals 77 and 78 indicate lenses respectively for projecting and receiving light and positioned respectively opposite the LED 72 and a photodiode 71 on the light detecting IC 70.

Light emitted from the LED 72 is projected forward through lens 77. If a target object to be detected is present in the travel path of this light, reflected light from a surface of the object is led through lens 78 to the light detecting IC 70. The light detecting IC 70 carries thereon not only the photodiode 71 for receiving the reflected light but also a processing circuit (not shown) for determining the presence or absence of a target object by processing the signal from this photodiode 71. The processing circuit makes this determination by comparing the level of the received signal with a specified threshold value and outputs a signal indicative of the result of the determination to an external device.

There have been other types of conventional photoelectric switches such as the so-called transmission type with a light emitter and a light receiver disposed opposite each other and the so-called optical fiber type using an optical fiber to transmit the light from the emitter or the reflected light from the target object.

Among the photoelectric switches of the reflection type, furthermore, there is also a so-called distance-setting type. A photoelectric switch of this type comprises a light detecting IC with a photodiode with two separated elements (hereinafter referred to as the divided photodiode) and capable of detecting the presence of a target object within a specified range of distance from the point of observation, for example, by considering the difference between the output signals from these photodiode elements and comparing the level of this differential signal with a specified threshold value.

In general, a photodiode with a large area must be used in a photoelectric switch if its detection distance (that is, the range of distance within which a target object is detectable) is to be set relatively long such that light from a large distance can be dependably received. Similarly, each element of a photoelectric switch of the distance-setting type must have a large area such that the difference in quantity of light received by the two elements of the divided photodiode can be accurately detected for a high-precision detection.

With a photoelectric switch of the optical-fiber type, it is also desirable to use a photodiode with a large area, especially when an optical fiber with a large diameter is used to transmit reflected light from a target object through an optical fiber to a light receiving element, such that divergent light propagating out of the end surface of the optical fiber facing the light receiving element can be dependably captured by the light receiving element.

If it is attempted to use a single light-detecting IC in common for a photoelectric switch with a long detection distance, a photoelectric switch of a distance-setting type, a photoelectric switch with an optical fiber having a large diameter so as to receive light efficiently and a photoelectric switch which does not require its detection distance to be too long, such that the effect of mass production will be improved, it becomes necessary to load a photodiode with a large diameter. Thus, the light detecting IC becomes large as a whole and its production cost is adversely affected. Even if the idea of using a single light-detecting IC is discarded and light-detecting ICs each loaded with a photodiode suited for a different kind of photoelectric switch are produced, the IC becomes large if loaded with a large photodiode or a divided photodiode. If an IC is produced such that the photodiode is to be connected externally, on the other hand, different ICs will have to be provided for different photoelectric switches because they have different processing circuits.

A brief survey reveals that most conventional photoelectric switches are of the transmission or reflection type, being used for purposes for which the detection distance need not be set too long and a photodiode with a modest area would be sufficient. Thus, it is cost-wise inefficient and increases the cost of an IC unnecessarily if light detecting IC loaded with a photodiode with a large area or a divided photodiode with two elements is produced for only infrequently used applications.

SUMMARY OF THE INVENTION

It is therefore an object of this invention to provide a cost-wise effective light detection IC having only one light receiving element with only a modest light receiving area but being connected to two separate light receiving elements or one large light receiving element such that output signals from such an externally connected element can be processed on the IC and hence that it can be used not only for situations where the detection distance need not be set long but also for situations where the detection distance is long, a distance is intended to be measured or an optical fiber with a large diameter is used.

It is another object of this invention to provide an inexpensive light detector of a type generating a signal for measuring distance by connecting such a light detecting IC with two separated light receiving elements and using output signals therefrom.

A light detecting IC embodying this invention, with which the above and other objects can be accomplished, may be characterized as comprising a single light receiving element, a first signal processing circuit for processing signals outputted from this light receiving element, an input terminal for receiving signals from outside, a second signal processing circuit for processing signals received from outside through the input terminal, and a switch circuit for selecting one or the other of these two signal processing circuits and outputting results of processing by the selected signal processing circuit.

The single light-receiving element is for receiving light from a light emitter disposed at a specified position or reflected from a target object of which the presence or absence is to be detected. A photodiode is usually used for this purpose. The first signal processing circuit serves to receive a signal from the light receiving element and to output the result of a signal processing carried out thereon according to the condition of the received light such as the result of comparison between the quantity of the received light and a specified threshold value. It may include an amplifier for amplifying the received signal, a comparator for comparing the amplified signal with the threshold value and an output circuit for outputting the signal received from the comparator to the exterior of the IC. The second signal processing circuit, like the first signal processing circuit, is structured so as to receive light from a light receiving element and to output a signal according to the condition of the received light. The switch circuit is for selectably connecting the single light receiving element with the first signal processing circuit or the input terminal with the second signal processing circuit. For making these connections, the switch circuit may include external terminals provided to the IC and its connecting lines. Suitable ones of these terminals are connected in order to select one of the signal processing circuits. The switch circuit may be installed on the IC. It may be placed anywhere with respect to the first and second signal processing circuits. It may be placed on the downstream side of the amplifier or of the comparator. It may be placed downstream to the first comparator and upstream to the second amplifier.

If the switch circuit selects the first signal processing circuit, the IC can be used for the ordinary purpose of a photoelectric switch (of either the transmission or reflection type) since the result of signal processing according to the condition of light received by the single light receiving element is outputted. If a light receiving element divided into two parts or a large light receiving element with a larger light receiving surface than that of the single light receiving element on the IC is connected to the external terminal and the switch circuit selects the second signal processing circuit, on the other hand, the result of processing in accordance with the condition of light received by the externally connected light receiving element is outputted. Thus, the IC can be used for a light detector of the distance-setting type or for a detection which would require a large light receiving area such as a detector using an optical fiber. Since light receiving elements of different kinds can be easily attached to the external terminals, an appropriate kind of light receiving element can be selectively attached to the external terminals, depending on the kind of light emitter used for the light detection.

In order to have a light receiving element of the type divided into two parts connected to the light detecting IC thus structured, the IC must be provided with a pair of external terminals. The second signal processing circuit is then structured with differential amplifiers for generating a differential signal representing the difference between the signals inputted through the external terminals and a comparator for comparing the level of this differential signal with a specified threshold value.

The light receiving elements of such a divided photodiode are individually connected to the external terminals. If these light receiving elements are placed at different positions with respect to the light emitter, a detection signal indicative of whether a target object is present within a specified range of distance from the point of observation can be outputted. If the differential signal is compared with a plurality of threshold values, it is possible to output a signal indicative of the distance or of the target object from the observation point.

If a light receiving element with a larger light receiving surface than that of the single light receiving element on the IC is connected, it is connected to one of the pair of the external terminals, the other terminal being grounded. In this case, the differential signal is indicative of the quantity of light received by this larger light receiving element. The differential signal thus obtained may now be processed (such as for comparing the signal level with a threshold value) by the first signal processing circuit.

According to a preferred embodiment of the invention, the first signal processing and the second signal processing circuit may be structured so as to share a single common circuit for the output of the result of processing. The circuit for outputting the result of signal processing is for outputting a final detection signal indicative of the presence of absence of a target object. If a circuit is required for matching the levels of the input signals through the internal light receiving element and the input signal through the external terminal, such a circuit may also be shared between the first and second signal processing circuits. When there is such a circuit connected in common to both the first and second signal processing circuits, the switch circuit serves to switch the connection between its common part and its individually dedicated parts.

A light detector embodying this invention is characterized as comprising such a light detecting IC provided with a pair of external terminals and a light detecting element divided into two parts connected to this pair of terminals. It is preferable to have both the IC and the divided light receiving element mounted to a single printed circuit board.

BRIEF DESCRIPTION OF THE DRAWINGS

Throughout herein, components which are equivalent or at least similar are indicated by the same symbols even if they are components of different light detectors and, for the convenience of disclosure, may not necessarily be explained repetitiously.

DETAILED DESCRIPTION OF THE INVENTION

Figure 1:
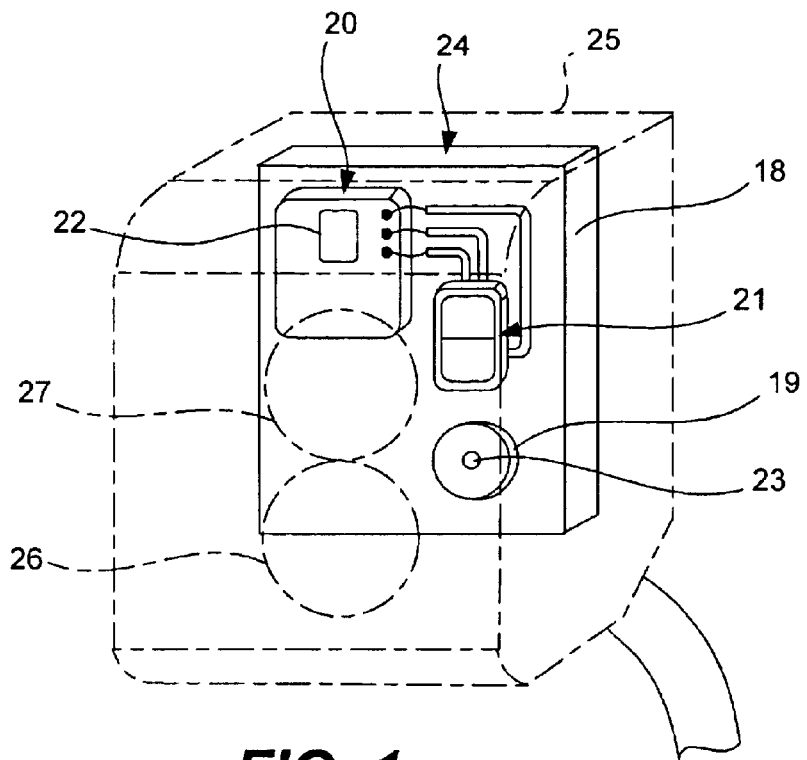
FIG. 1 is a diagonal view of a light detector embodying this invention as incorporated into a photoelectric switch of a distance-setting type.
Figure 11:
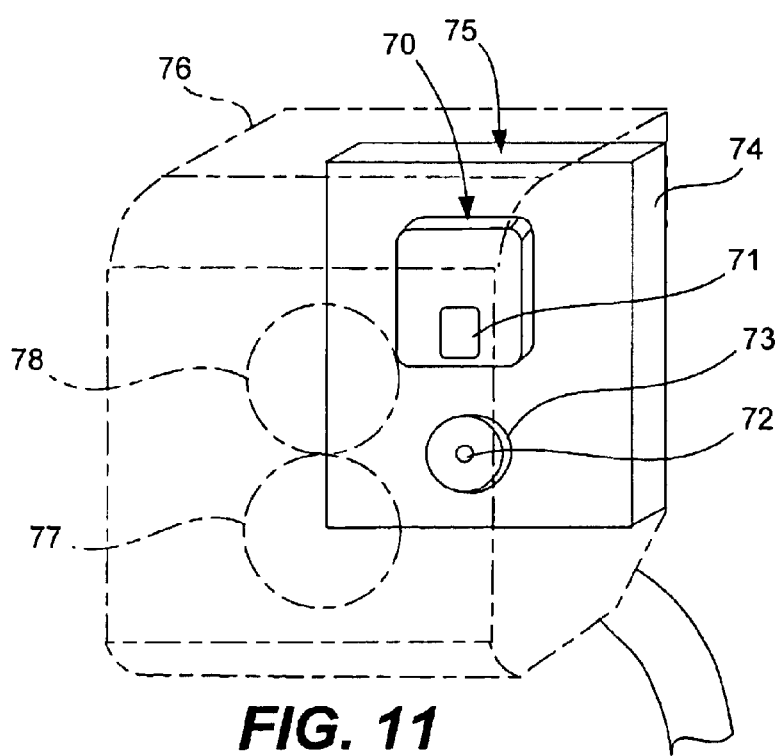
FIG. 11 is a diagonal view of a light detector used for a conventional photoelectric sensor of a reflection type.

FIG. 1 shows a light detector 24 embodying this invention, as incorporated in a photoelectric switch of the distance-setting type, having a light emitter 19 provided with an LED 23, a light detecting IC 20 and a divided photodiode 21 with two elements carried on a printed circuit board 18. Numeral 25 indicates a casing which constitutes the main body of the photoelectric switch. Numerals 26 and 27 indicate lenses respectively for projecting and receiving light.

A single photodiode (hereinafter referred to as the internal photodiode) 22 is mounted to the light detecting IC 20, which is also provided with a plurality of terminals inclusive of input terminals for connecting to the two elements of the divided photodiode 21, as well as circuits for selecting between the internal photodiode 21 mounted to the light detecting IC 20 and the divided photodiode 21 and for processing signals from a selected element to detect the presence of a target object.

Figure 2:
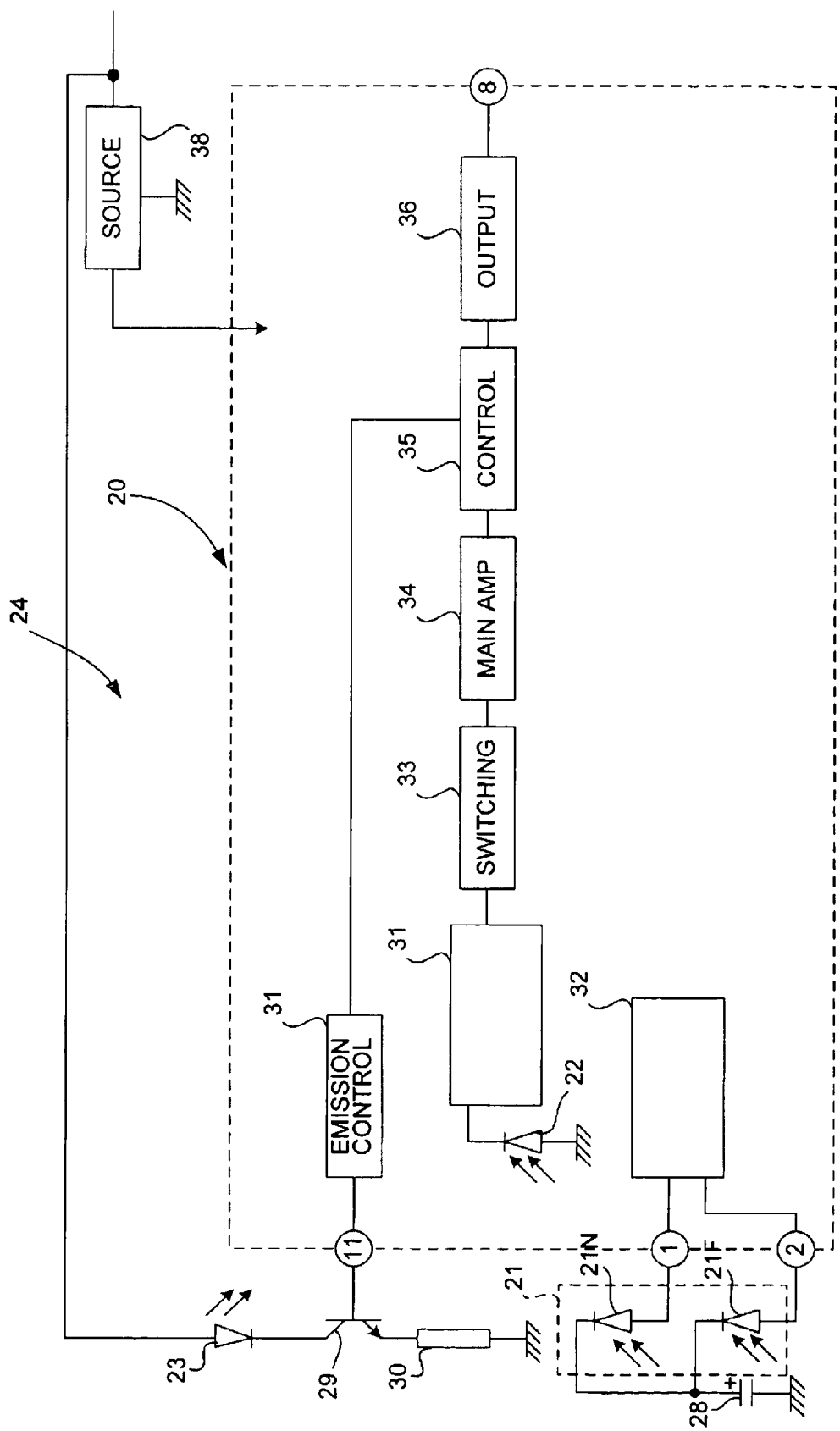
FIG. 2 is a schematic block diagram of a light detector.

FIG. 2 shows the two elements of the divided photodiode 21 (hereinafter referred to as the near-element 21N and the far-element 21F). They are positioned such that they will receive a same quantity of reflected light if the light-reflecting surface of a target object is at a specified "standard position" but the near-element 21N will receive more light if the target object is closer to the light detector 24 than the standard position and the far-element 21F will receive more light if the target object is farther away from the light detector 24 than the standard position. Numeral 28 indicates a decoupling capacitor for the elements 21N and 21F, numerals 29 and 30 indicate respectively a driver transistor and a resistor for the emission of light from the LED 23, and numeral 38 indicates an external power source for the IC 20.

The light detecting IC 20 is provided not only with input terminals 1 and 2 for connecting to the elements 21N and 21F but also with an output terminal 8 through which a detection signal is outputted to an external device (not shown), as well as a pulse output terminal 11 for transmitting driving pulses to the driver transistor 29 for the LED 23. Mounted also to the ID 20 are a preprocessing circuit ("the internal signal preprocessing circuit") 31 for preprocessing an output from the internal photodiode 22, another preprocessing circuit ("the external signal preprocessing circuit") 32 for preprocessing signals ("Signal N" and "Signal F") inputted from the elements 21N and 21F respectively through the input terminals 1 and 2, a switch circuit 22, a main amplifier 34, a control circuit 35, an output circuit 36 and a light emission control circuit 37.

The internal signal preprocessing circuit 31 includes an I/V conversion circuit and an amplifier circuit for converting the output current from the internal photodiode 22 into a voltage to be taken out as a light-receiving signal. The external signal preprocessing circuit 32 includes not only I/V conversion circuits individually for the elements 21N and 21F but also a differential amplifier for differentiating and amplifying Signals N and F outputted from these I/V conversion circuits.

The main amplifier 34, the control circuit 35 and the output circuit 36 are internally set and common to the both photodiodes 21 and 22. The switch circuit 33 is for selectably connecting either the internal signal preprocessing circuit 31 or the external signal preprocessing circuit 32 to the main amplifier 34. The signals from the selected circuit are inputted through the main amplifier 34 to the control circuit 35.

The control circuit 35 serves to cause the LED 23 to emit light by supplying a drive pulse to the light emission control circuit 37 and also to output a detection signal indicative of the presence or absence of an object by comparing the amplified output from the main amplifier 34 with a specified threshold value in synchronism with the timing of the drive pulse. The output circuit 36 is connected to the output terminal 8 and serves to output the detection signal from control circuit 35 to an external device through this output terminal 8.

In summary, with the divided photodiode 21 connected to the input terminals 1 and 2 and the external signal preprocessing circuit 32 connected to the main amplifier 34 through the switch circuit 33, a detection process by using the amplified differential signals from the divided photodiode 21 can be carried out on the light detecting IC 20 itself. If the divided photodiode 21 is not connected to the input terminals 1 and 2 and the internal signal preprocessing circuit 31 is connected to the main amplifier 34, on the other hand, a simpler detection process is carried out by using the light-receiving signal from the internal photodiode 22.

Figure 3:
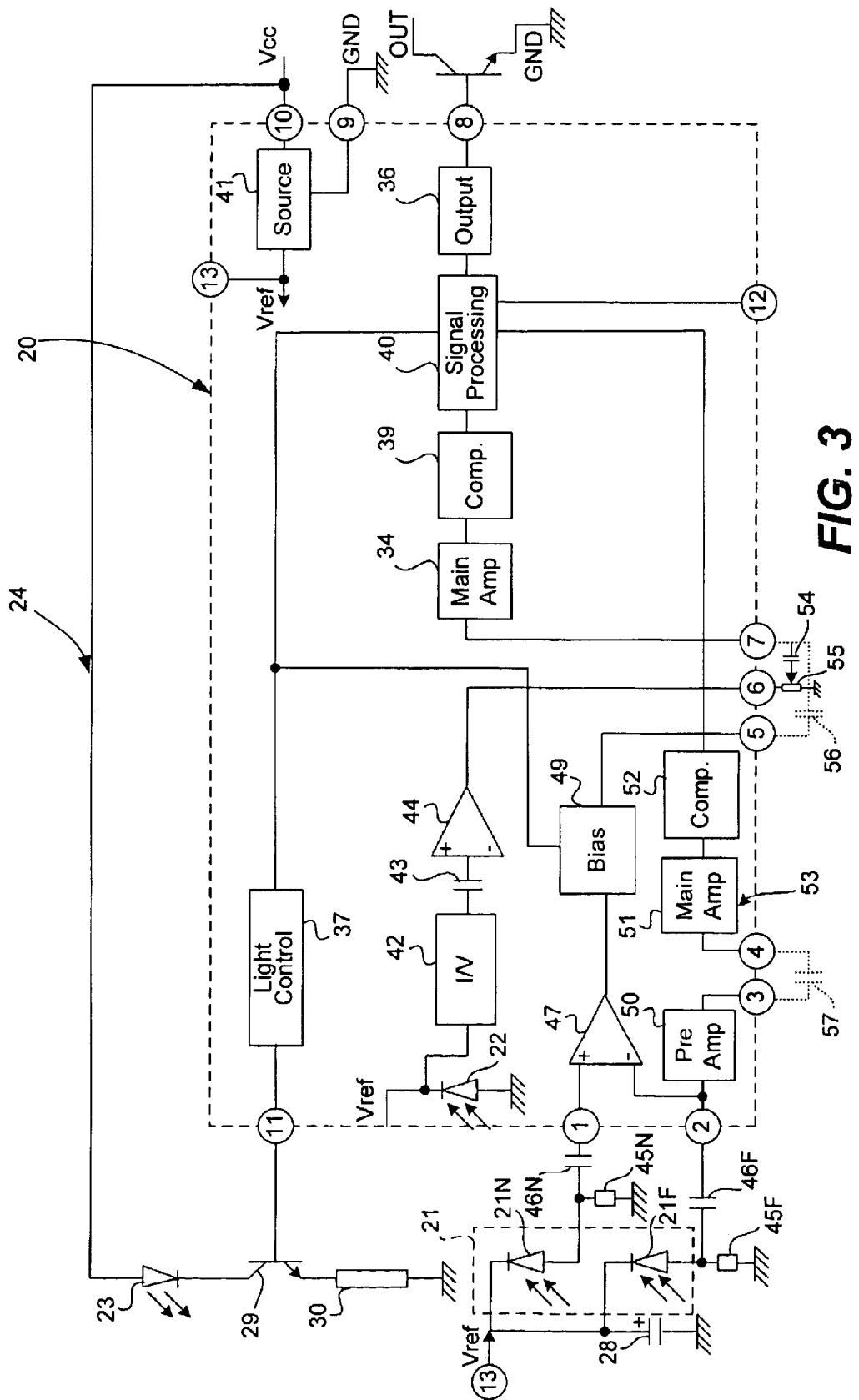
FIG. 3 is a block diagram of a light detector according to a first embodiment of the invention.

Next, the structure of the light detector 24 is described more in detail by way of examples. FIG. 3 shows a first example of the light detector 24 characterized wherein a portion of the structure corresponding to the external signal preprocessing circuit 32 and the structure corresponding to the switch circuit 33 shown in FIG. 2 are exterior to the light detecting IC 20.

The light detecting IC 20, shown in FIG. 3, carries thereon not only a main amplifier 34, a comparator 39, a signal processing circuit 40 and an output circuit 36 which serve in common both the divided photodiode 21 and the internal photodiode 22 but also the light emission control circuit 37 and a power source circuit 41. The comparator 39 and the signal processing circuit 40 correspond to the control circuit 35 of FIG. 2. The signal processing circuit 40 serves to supply driving pulses to the light emission control circuit 37. The power source circuit 41 serves not only as a power source for the various circuits on the light detecting IC 20 but also to generate a biasing voltage $V_{ref}$ applied to the divided photodiode 21. In FIG. 3, numerals 9 and 10 respectively indicate a terminal for grounding the power source circuit 41 and a terminal for connecting the power source circuit 41 to a power source $V_{CC}$.

The light detecting IC 20 is also provided with an I/V conversion circuit 42, a coupling capacitor 43 and a preamplifier 44 as components of a preprocessing circuit for the internal photodiode 22. Outside the light detecting IC 20, there are resistors 45N and 45N connected to the anodes of the elements 21N and 21F of the divided photodiode 21 for converting photoelectric currents into voltages. Output signals (referred to as Signals N and F above) passed through these resistors 45N and 45F are transmitted through the coupling capacitors 46N and 46F to terminals 1 and 2, respectively.

Although the resistors 45N and 45F and the coupling capacitors 46N and 46F for the I/V conversion may be mounted to the light detecting IC 20 in order to reduce the number of components to be externally connected, the example shown in FIG. 3 is advantageous wherein the capacity of the light detecting IC 20 can be limited. The lengths of the connecting wires between the divided photodiode 21 and the light detecting IC 20 should preferably be made as short as possible.

A differential amplifier 47 and a bias circuit 49 are also mounted to the light detecting IC 20 as a preprocessing circuit for the divided photodiode 21. There is also installed an output control circuit 53 composed of a preamplifier 50, a main amplifier 51 and a comparator 52.

The plus and minus input terminals of the differential amplifier 47 are respectively connected to terminals 1 and 2 such that the difference between Signal N from the near-element 21N and Signal F from the far-element 21F is amplified and inputted to the bias circuit 49 (as the "N-F signal").

The bias circuit 49 serves to bias the N-F signal by signals which are in synchronism with the driving pulse from the signal processing circuit 40 to the light emission control circuit 37. The purpose of this bias-setting process is to match the levels of the N-F signal and the light-receiving signal from the internal photodiode 22. When the N-F signal is at a zero-level, a bias is set such that this zero-level signal will be changed to the same level as that of the light receiving signal when a target object is at the standard position as the internal photodiode 22 is used for the detection.

The preamplifier 44 at the downstream end of the preprocessing circuit for the internal photodiode 22 is connected to terminal 6. The bias circuit 49 at the downstream end of the preprocessing circuit for the divided photodiode 21 is connected to terminal 5. The input side of the main amplifier 34 is connected to terminal 7.

When the light detecting IC 20, thus structured, is used for detection by means of the light-receiving signal from the internal photodiode 22, terminals 6 and 7 are connected such that the output from the preamplifier 44 is transmitted to the main amplifier 34. If the divided photodiode 21 is externally connected, on the other hand, terminals 5 and 7 are connected as shown by a dotted line such that the output from the bias circuit 49 is transmitted to the main amplifier 34.

When terminals 6 and 7 are connected, as explained above, a coupling capacitor 54 is inserted therebetween and a volume resistor 55 for adjusting the output voltage level from the preamplifier 44 is connected to terminal 6. When terminals 5 and 7 are connected, a coupling capacitor 56 is similarly inserted therebetween, and indicated by dotted line in FIG. 3.

Since not only the preprocessing circuits and the main amplifier 34 but also the coupling capacitors 54 and 56 for cutting noise are externally connected according to this example, the light detecting IC 20 can be made compact. The coupling capacitors 54 and 56 may be installed on the light detecting IC 20. The function of the volume resistor 55 for adjusting the output voltage level may be realized by providing a function for adjusting the light output.

The preamplifier 50 and the main amplifier 51 within the output control circuit 53 are normally disconnected but are connectable through terminals 3 and 4. The preamplifier 50 is connected to terminal 2. Still another coupling capacitor 57 may be inserted between terminals 3 and 4, but this coupling capacitor 57, too, may be provided on the light detecting IC 20.

The connection between terminals 3 and 4 is effected together with the connection between terminals 5 and 7 when the divided photodiode 21 is externally attached. When terminals 3 and 4 are connected together, Signal F from the terminal 2 is inputted through the preamplifier 50 and the main amplifier 51 into the comparator 52. The comparator 52 is connected to the signal processing circuit 40 and serves to output an H-level signal (hereinafter referred to as the "output control signal") to the signal processing circuit 40 when Signal F received through the amplifiers 50 and 51 is found to be higher than a specified level.

Explained more in detail, the main amplifier 34 serves to invert and amplify inputted signals. The comparator 39 receives this inverted and amplified signal and outputs an H-level signal to the signal processing circuit 40 when the inputted signal exceeds a specified level (or become more negative than the specified level).

The signal processing circuit 40 accepts output signals from the comparator 39 in synchronism with the driving pulse to the light emission control circuit 37 and then to the output circuit 36. The signal processing circuit 40 is connected to a terminal 12 for receiving external signals and is structured so as to output an L-level signal by ignoring the H-level signal from the comparator 39 if both the signal received through the terminal 12 and the output control signal from the output control circuit 53 are L-level signals.

According to the example being described, the terminal 12 is adapted to be connected to an L-level voltage when the divided photodiode 21 is used and to an H-level voltage when the internal photodiode 22 is used such that the received light-receiving signal becomes valid.

If it is the divided photodiode 21 that is being used for the detection, the N-F signal becomes zero not only when the target object is at a position where each of the elements 21N and 21F receives the same quantity of reflected light but also when there is no reflected light being incident on them (that is, when there is no target object present). The output control signal from the output control circuit 53 serves the purpose of distinguishing between these two different situations under which the N-F signal becomes zero, controlling such that an output of a detection signal will be made only when there is a target object present. In other words, since the output control signal is L and the inputted voltage through the terminal 12 is also L in the absence of a target object, the H signal from the comparator 39 is invalidated, and the signal outputted from the signal processing circuit 40 is L.

Figure 4:
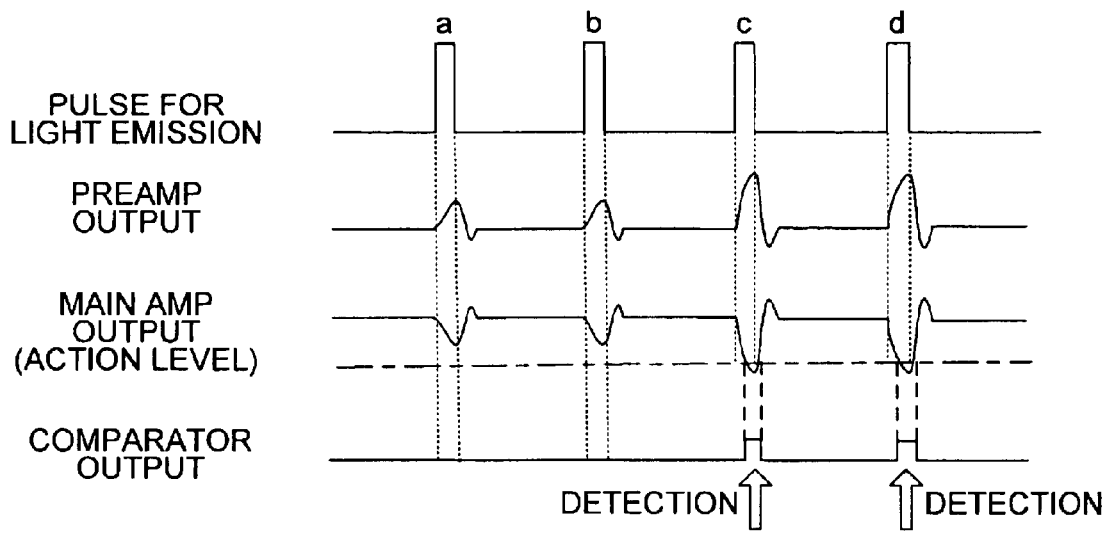
FIG. 4 is a timing chart for the operation of the circuits related to the internal photodiode of FIG. 3.

FIG. 4 shows an example of signal waveforms when terminals 6 and 7 of the light detecting IC 20 are connected for a detection process by means of the light-detection signals from the internal photodiode 22. In FIG. 4, letters a and b indicate situations where a target object is at a position farther away than a specified standard position and letters c and d indicate another situation where the target object is closer to the detector than the standard position. The horizontal chain line in FIG. 4 indicates the action level of the comparator 39, set on the basis of the level of received light by the internal photodiode 22 when the target object is exactly at the standard position.

In situations a and b, the quantity of reflected light from the target object is smaller than what would be obtained at the standard position and hence the output from the main amplifier 34 does not reach the action level for the comparator 39. In situations c and d, by contrast, the light receiving signal exceeds the quantity of reflected light obtained at the standard position. Since the signal from the main amplifier 34 exceeds the action level of the comparator 39, an H-level signal is outputted from the comparator 39.

Since an H-level signal is inputted from the terminal 12 in this situation, the output from the comparator 39 is validated. After a signal processing routine is carried out by an integrating circuit or a shift register in the signal processing circuit 40, the output circuit 36 transmits a signal indicating the presence of a target object.

Figure 5:
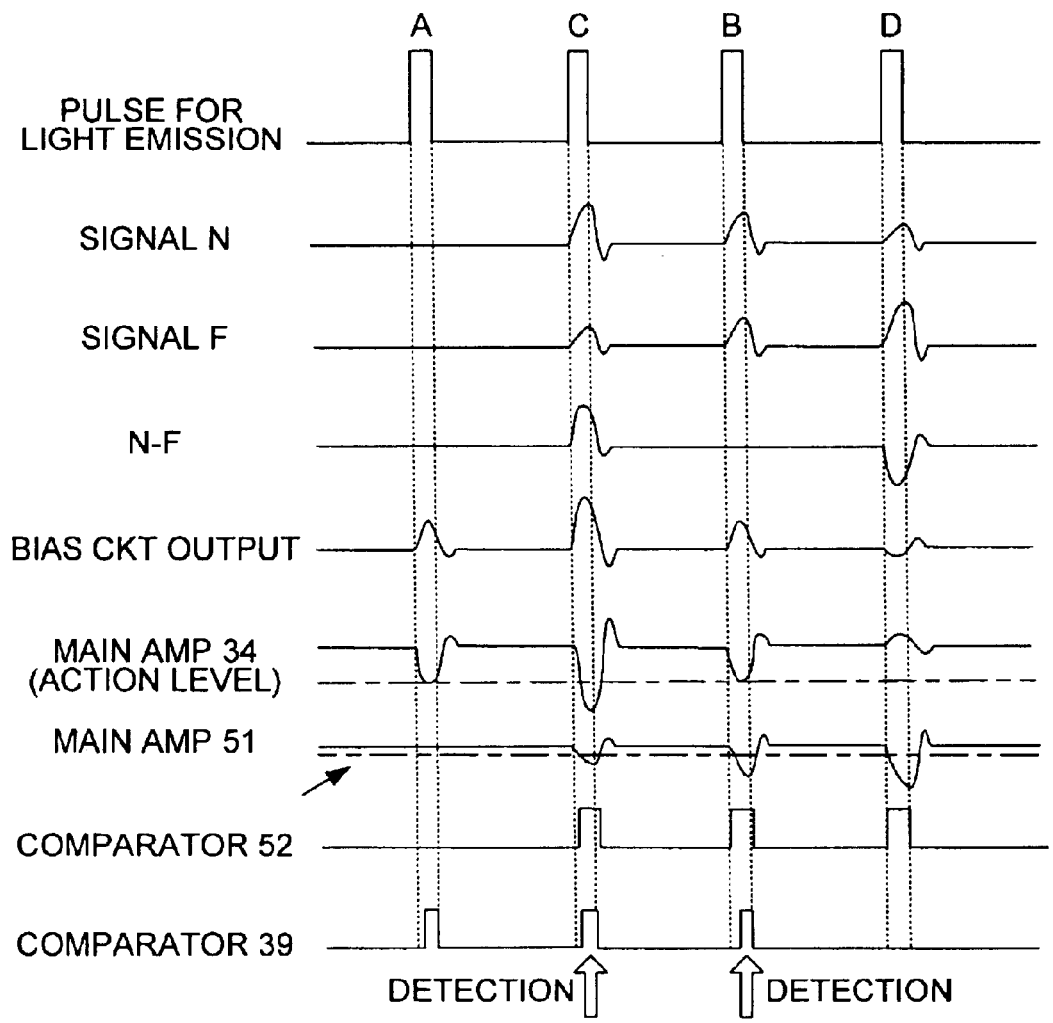
FIG. 5 is a timing chart for the operation of the circuits related to the divided photodiode of FIG. 3.

FIG. 5 shows the operations of various circuits when terminals 5 and 6 and terminals 3 and 4 are connected, that is, when light-receiving signals from the divided photodiode 21 are used for the detection. In FIG. 5, letters A, B, C and D respectively show the signals when there is no target object, when a target object is at the standard position, when the target object is at a position closer than the standard position and when the target object is at a position farther away than the standard position.

The bias circuit 49 is adapted to apply a bias of a level corresponding to the action level of the comparator 39 to the N-F signal from the differential amplifier 47. The N-F signal is zero under the conditions A and B of FIG. 5 and is compared with the action level by the comparator 39 through the bias circuit 49 and the main amplifier 34. As a result, the comparator 39 outputs an H-level signal as shown in FIG. 5.

At A, however, since both the output control signal from the comparator 52 of the output control circuit 53 and the terminal 12 are L signals, the output from the comparator 39 is invalidated and a signal indicative of "no target object" is outputted. At B, on the other hand, since the output control signal is H although the signal from the terminal 12 is L, the H-signal from the comparator 39 is validated and a signal indicative of "object present" is outputted.

At moment C, the N-F signal becomes positive because the level of Signal N becomes higher than that of Signal F. As a result, the signal which passes through the bias circuit 49 and the main amplifier 34 exceeds the action level of the comparator 39 (becoming lower in voltage than the action level), and the output from the comparator 39 becomes H. Since an H-level signal is being outputted from the comparator 52 of the output control circuit 53 at this time, the H-level output from the comparator 39 is validated, as in the case of B, and a signal indicative of the presence of a target object is outputted.

At moment D, the N-F signal becomes negative because the level of Signal F becomes higher than that of Signal N. As a result, the output from the main amplifier 34 fails to reach the action level of the comparator 39. Thus, an L-level signal is outputted from the comparator 39 and a signal indicative of the absence of a target object is outputted.

Figure 6:
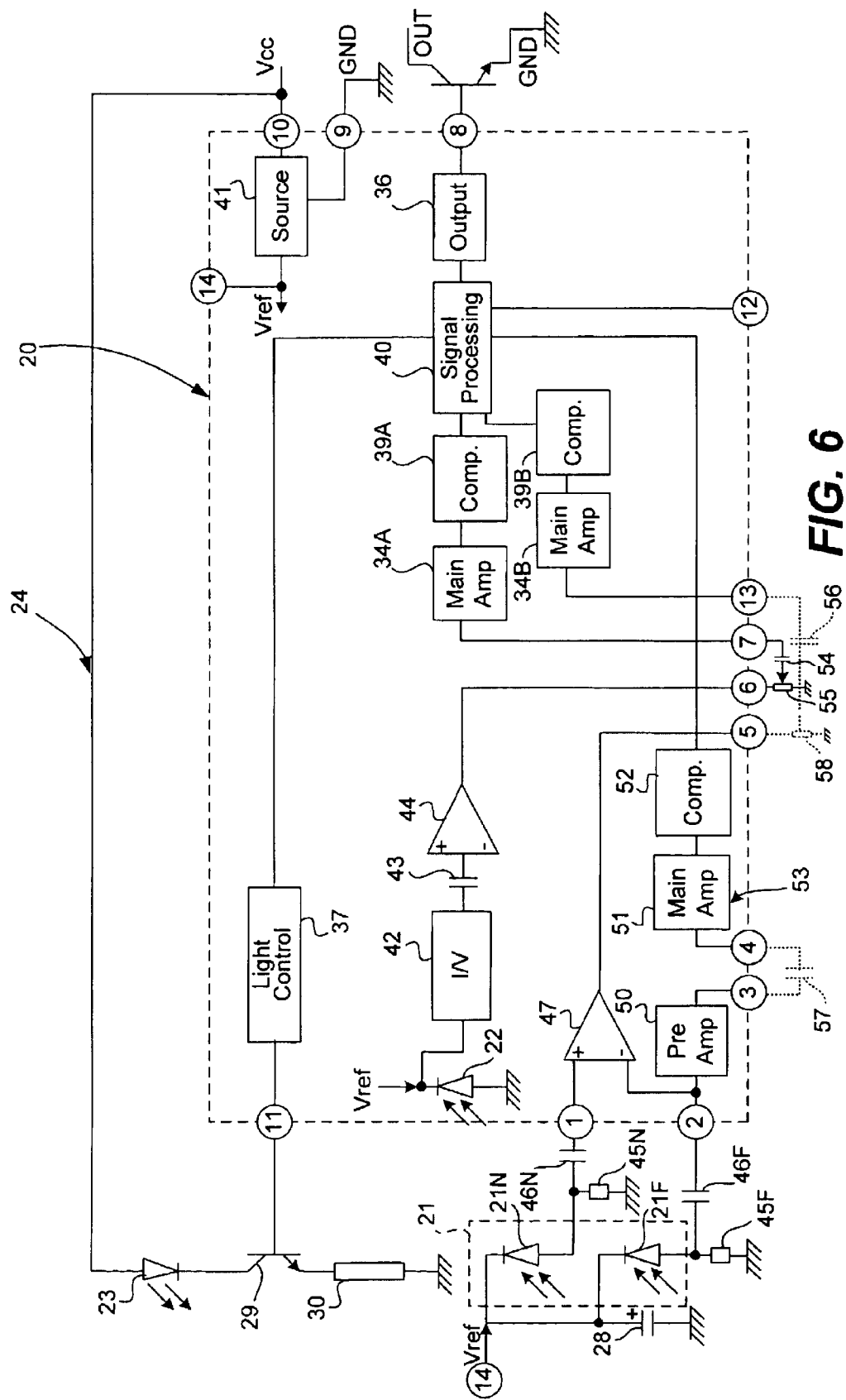
FIG. 6 is a block diagram of a light detector according to a second embodiment of the invention.

FIG. 6 shows another example of the light detector 24, characterized wherein the light detecting IC 20 is provided with individual main amplifiers 34A and 34B and comparators 39A and 39B, respectively for the internal photodiode 22 and the divided photodiode 21. The structures of the preprocessing circuits for the photodiodes 21 and 22 and the output control circuit are the same as shown in FIG. 3.

The main amplifier 34A for the internal photodiode 22 is connected to terminal 7 and the main amplifier 34B for the divided photodiode 21 is connected to terminal 13. Thus, when the internal photodiode 22 is to be used, terminals 6 and 7 are connected together such that a light-receiving signal from the internal photodiode 22 will be inputted to the main amplifier 34A. When the divided photodiode 21 is used, terminals 5 and 13 are connected together such that the N-F signal obtained from the elements 21N and 21F of the divided photodiode 21 is inputted to the main amplifier 34B. The connection between terminals, in both cases above, is effected through a coupling capacitor 34 or 56.

The signal processing circuit 40, in this example, receives the output from the comparator 39A or 39B in synchronism with the timing of the driving signals for the light emission control circuit 37. Similarly to the situation shown in FIG. 3, an L-voltage is applied to terminal 12 when the divided photodiode is used and an H-voltage is applied when the internal photodiode is used. When the divided photodiode is used, the output from the comparator 39B is invalidated if there is no target object because both terminal 12 and the signal from the output control circuit 53 are L-level.

Figure 7:
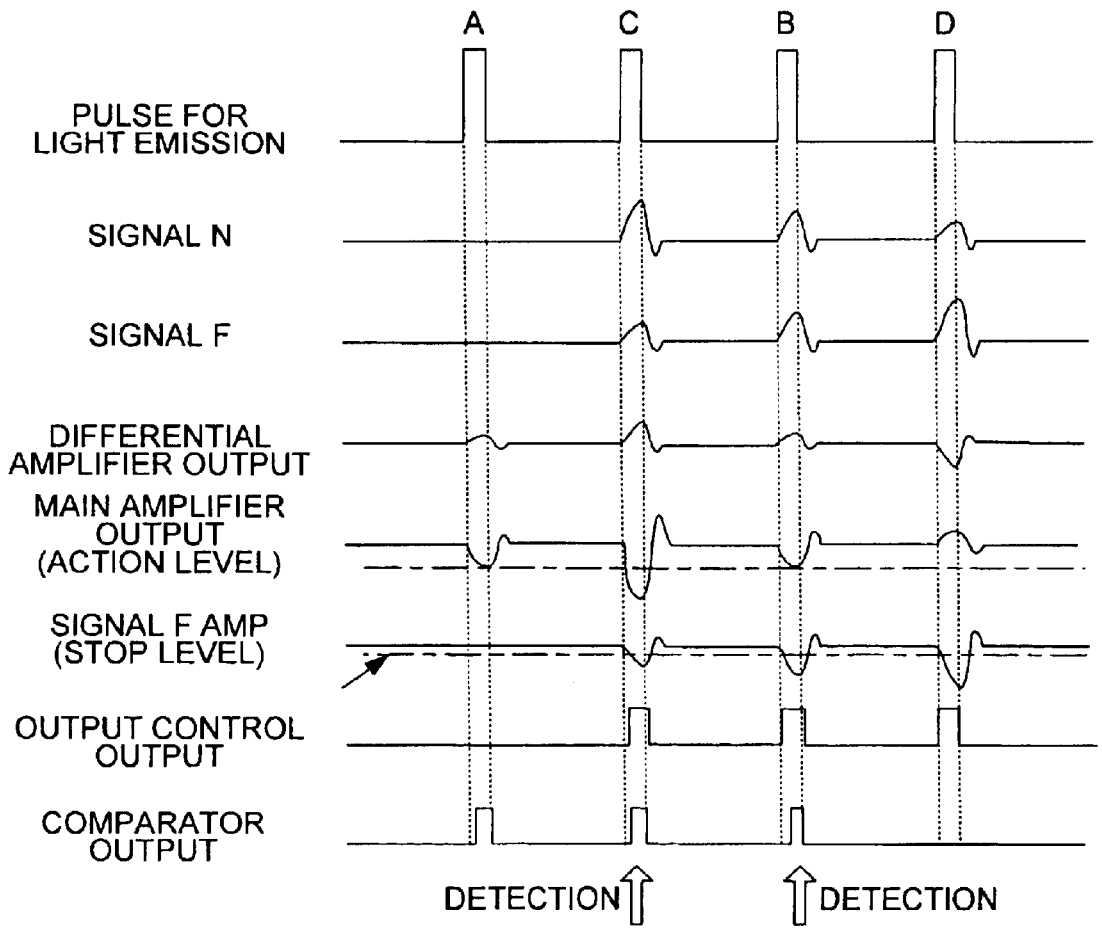
FIG. 7 is a timing chart for the operation of the circuits related to the divided photodiode of FIG. 6.

FIG. 7 shows the operations of the example shown in FIG. 6 when terminals 5 and 13 and terminals 3 and 4 are connected together such that a detection process is carried out by the divided photodiode 21. Operations when the internal photodiode 22 is used for detection are the same as shown in FIG. 4 and hence will not be repetitiously explained.

In FIG. 7, letters A, B, C and D indicate the same situations as in FIG. 5. In this example, the differential amplifier 47 is set so as to output a signal with a bias of a specified level such that a signal with a level corresponding to the action level of the comparator 39B is outputted from the main amplifier 34B in situations A and B when Signals N and F become equal. The subsequent operations are the same as explained above with reference to FIG. 5 such that an "absent" signal is outputted in the case of A and a "present" signal is outputted in the case of B. Operations for detection in cases C and D are also as explained above with reference to FIG. 5.

FIGS. 6 and 7 show still another example characterized in that the structures down to the signal processing circuit 40 are entirely separated into parts corresponding individually to the internal and divided photodiodes 22 and 21. Thus, unlike the example of FIG. 1, there is no need to match the levels of signals after the preprocessing. Optimum action levels can be set individually for the comparators 39A and 39B corresponding to the associated photodiodes 21 and 22.

Figure 8:
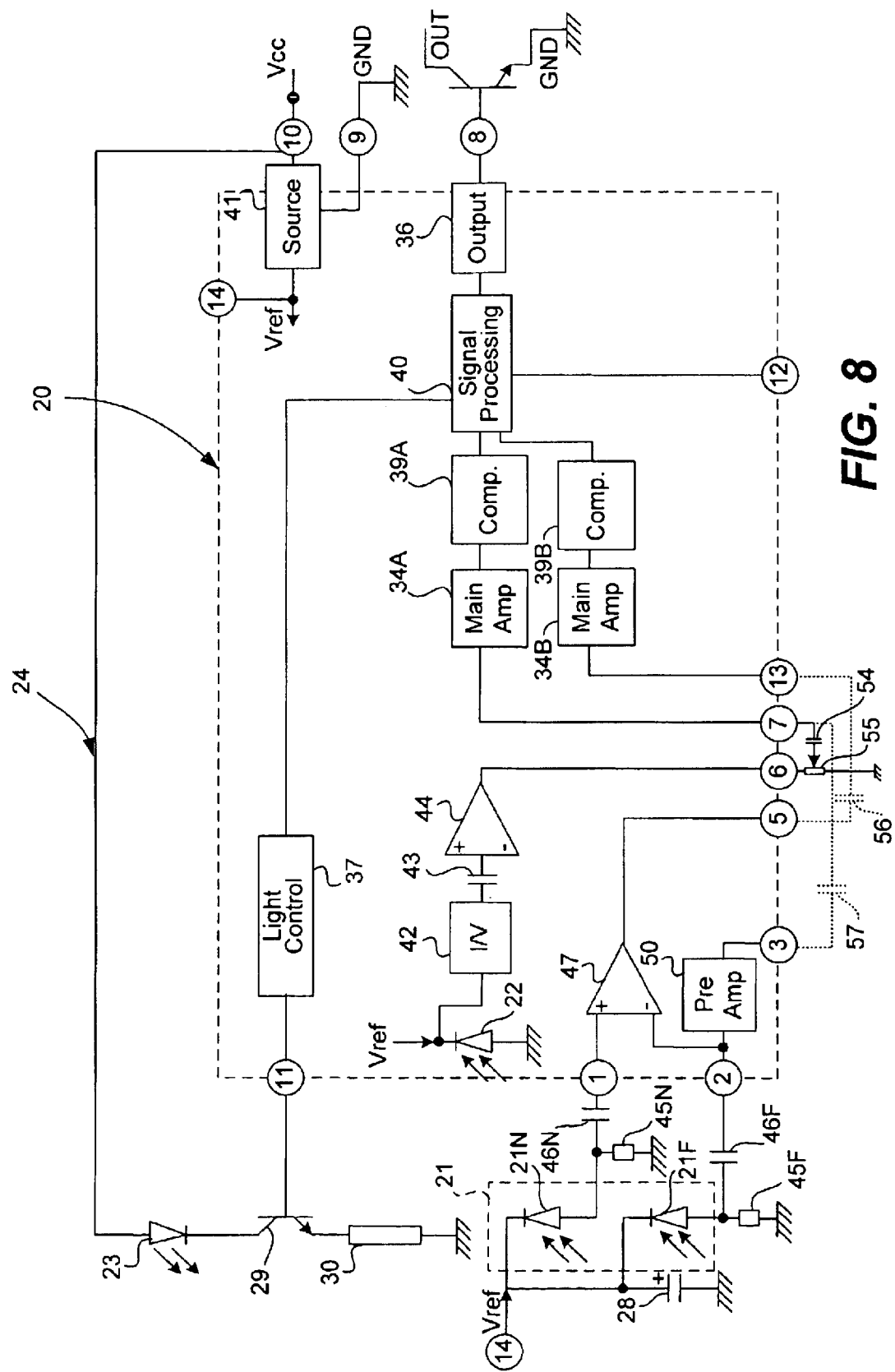
FIG. 8 is a block diagram of a light detector according to a third embodiment of the invention.

FIG. 8 shows still another example which is similar to FIG. 6 on the upstream side of the signal processing circuit 40 wherein circuits are provided individually for the two photodiodes 21 and 22 but is different in that its circuit for processing the light receiving signal from the internal photodiode 22 is provided also with the functions of the output control circuit 53. Explained more in detail, its output control circuit 53 includes only a preamplifier 50 as its own component. If this preamplifier 50 is connected to the main amplifier 34A for the internal photodiode 22 through terminals 3 and 7, the main amplifier 34A and the comparator 39A serve as a circuit for processing Signal F through the preamplifier 50.

When the internal photodiode 22 is used for detection, terminal 12 is at H-level and terminals 6 and 7 are connected together, as explained above with reference to FIG. 6, such that the output from the preamplifier 44 is transmitted to the main amplifier 34A. When the divided photodiode 21 is to be used, terminal 12 is at L-level and terminals 5 and 13 are connected together to input the N-F signal to the main amplifier 34B and terminals 3 and 7 are also connected together to use the main amplifier 34A and the comparator 39A as a signal control circuit 53.

In this example, the signal processing circuit 40 is provided with circuits (the "first circuit" and the "second circuit") respectively for outputting the OR and AND operations on the outputs from the comparators 39A and 39B on the upstream side and a switch circuit for switching between the first and second circuits. Terminal 12 which is connected to this signal processing circuit 40 is connected to an H voltage when the internal photodiode 22 is used and to an L voltage when the divided photodiode 21 is used, as explained above with reference to FIGS. 3 and 6. Thus, the switch circuit in this signal processing circuit is set so as to select the first circuit when the signal from terminal 12 is H and the second circuit when the signal from terminal 12 is L. As a result, the output from the comparator 39A is always validated when the internal photodiode 22 is used and the detection routine as explained above with reference to FIG. 4 is carried out. When the divided photodiode 21 is used, the H-level output from the comparator 39B is validated only when the output control signal from the comparator 39A is H, and the same detection routine as explained above with reference to FIG. 7 is carried out.

It should be noted that a light detecting IC 20 according to any of the three examples described above can be used also with a single external photodiode with a larger area than that of the internal photodiode 22, instead of a divided photodiode.

Figure 9:
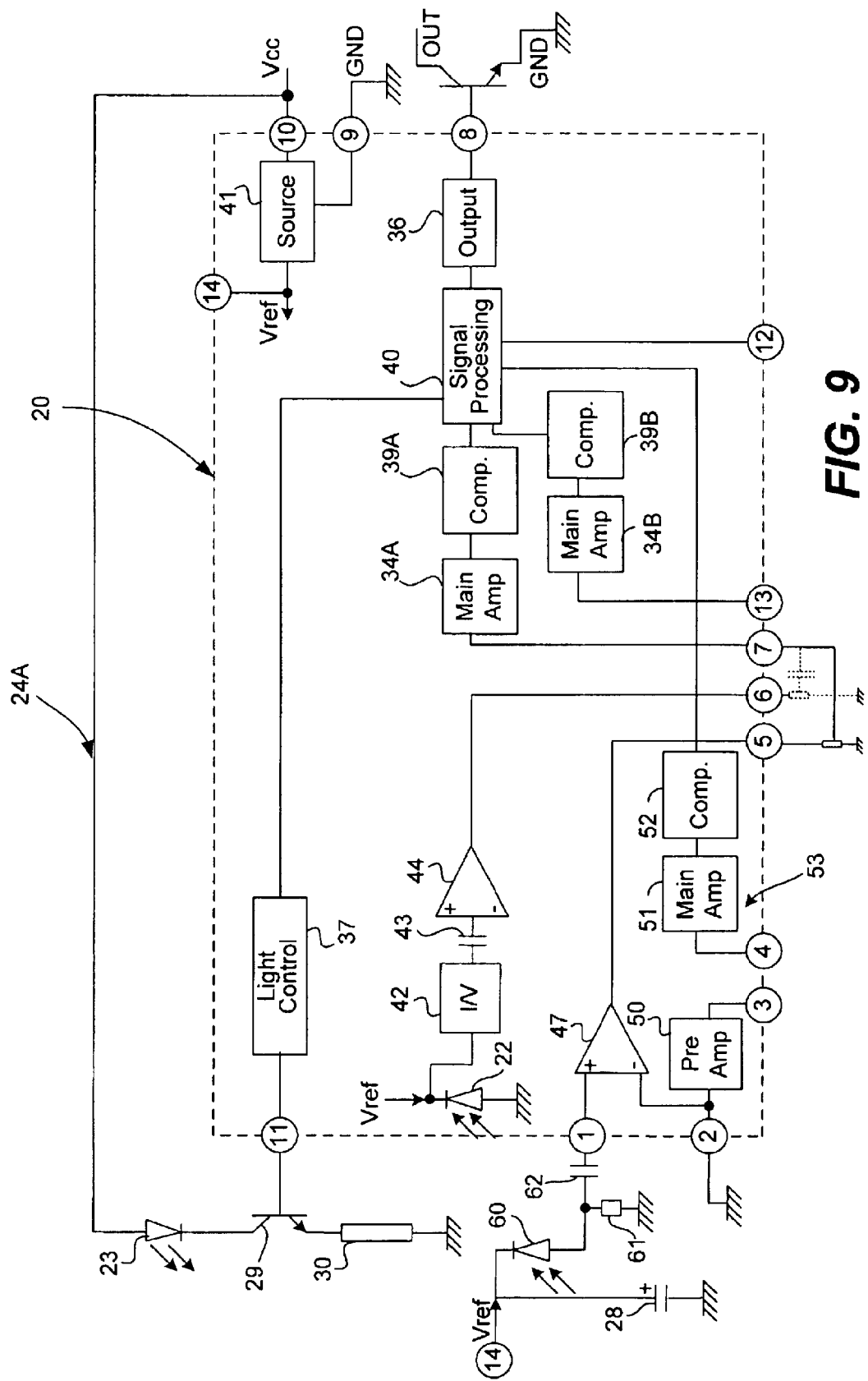
FIG. 9 is a block diagram of the light detecting IC of FIG. 6 with a single photodiode connected.

FIG. 9 shows a light detector 24A having a single photodiode 60 connected to a light detecting IC 20 structured as shown above in FIG. 6, the photodiode 60 being connected to terminal 1 while terminal 2 is grounded. In FIG. 9, numeral 61 indicates a resistor for converting the photoelectric current from the photodiode 60 into a voltage signal and numeral 62 indicates a coupling capacitor. With the photodiode 60 thus connected, terminals 5 and 7 are connected such that the amplified differential output from the differential amplifier 47 is processed by the main amplifier 34A and the comparator 39A for the internal photodiode 23.

Figure 10:
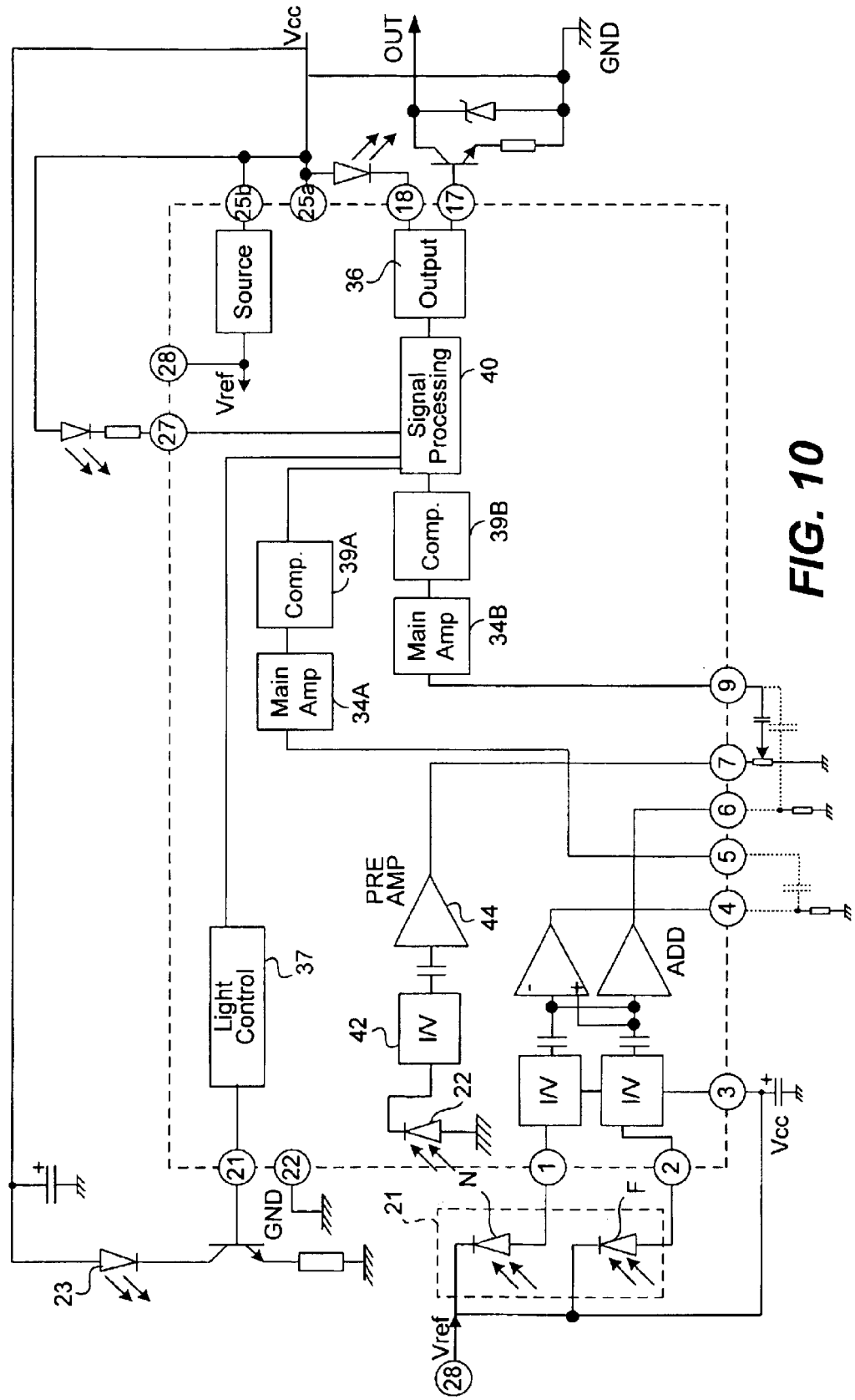
FIG. 10 is a block diagram of a light detector according to a fourth embodiment of the invention.

Since the input signal from terminal 2 is of zero-level while a signal of a level corresponding to the quantity of received light by the photodiode 60 is inputted from terminal 1, the light receiving signal from the photodiode 60 is inputted to the main amplifier 34A through the differential amplifier 47 and the coupling capacitor 56, and a detection routine by using the light receiving signal from the photodiode 60 is carried out thereafter as done for the internal photodiode 22 as explained above. In the example shown in FIG. 9, the input signal from terminal 12 is connected to a voltage of an H level. Since the output control circuit 53 is not used, terminals 3 and 4 are left open. FIG. 10 shows still another variation adapted to add Signals N and F to transmit the sum to the signal processing circuit such that situations where no reflected light is received by either of the elements of the divided photodiode 22 can be distinguished. This embodiment is also characterized as having the I/V conversion circuits of the divided photodiode 21 installed on the IC such that the number of external circuits to be connected can be reduced.

When the internal photodiode 22 is used for the detection, terminals 7 and 9 are connected such that the light receiving signal therefrom is converted into a voltage signal by I/V conversion circuit 42 and after it is amplified by amplifiers 44 and 34B, it is compared with a specified threshold value by the comparator 39B, the result of this comparison being outputted through the output circuit 36. When the externally connected divided photodiode 21 is used, terminals 4 and 5 and terminals 6 and 9 are connected, as indicated by broken lines. The detector 24 is preliminarily set such that a same quantity of light will be received by the elements 21N and 21F when a target object is at a standard position.

If a target object is present somewhere closer than the standard position, the output from the near-element 21N becomes greater than that from the far-element 21F. Their outputs are amplified by an addition amplifier (ADD) and then by the main amplifier 34B through terminals 7 and 9. The comparator 39B compares this amplified signal with the specified threshold value and outputs an H signal. At the same time, a differential signal of the outputs from the elements 21N and 21F is amplified by main amplifier 34A through terminals 4 and 5, and the comparator 39A compares this amplified differential signal with a specified threshold value such as 0V to output an H signal. From these outputs from the comparators 39A and 39B, the output circuit 36 outputs a signal indicative of the presence of a target object somewhere closer than the standard position.

If a target object is present somewhere farther than the standard position, the output from the far-element 21F becomes larger than that from the near-element 21N. In this case, the output from comparator 39B is an H-signal, as above, but the output from comparator 39A is an L-signal. Receiving these comparison signals outputted from the comparators 39A and 39B, the signal processing circuit 40 outputs an L signal, indicating that there is no object closer to the observation point than the standard position.

If there is no object sending reflected light to the near-element 2 IN or the far-element 21F, the outputs therefrom are both nearly equal to zero. Thus, the output from main amplifier 34B is smaller than the threshold value for comparator 39B and the output from comparator 39B becomes an L-signal. On the other hand, the output from main amplifier 34A is not clearly positive or clearly negative, and hence the output from comparator 39A is unstable. In this situation, the signal processing circuit 40 outputs an L signal, indicating that there is no target object anywhere closer than the standard position.

Although the invention has been described above with reference to only a limited number of examples, these examples are not intended to limit the scope of the invention. Many modifications and variations are possible within the scope of the invention. For example, although only so-called divided photodiodes with two separated light receiving elements were described as examples of distance-setting type of photoelectric switches to be connected externally to a light detector embodying this invention, a so-called position sensitive device, characterized as outputting different signals depending on the position of the received light spot on its light-receiving surface, may instead be connected to the pair of input terminals of any of the detectors of this invention described above. A position sensitive device (although not illustrated for simplifying the disclosure) is typically provided with an elongated light-receiving surface and output terminals are at its longitudinal end positions such that the intensity of the current which passes through these output terminal depends on the position of the received light on the light-receiving surface. The distance to a target object can be estimated from the position of the light spot.

What is claimed is:

1. A light detecting IC comprising:

a single light receiving element;

a first signal processing circuit for processing signals outputted from said light receiving element;

an input terminal means for inputting signals from outside;

a second signal processing circuit for processing signals received from outside through said input terminal means; and a switch means for selecting one from said first and second signal processing circuits and outputting results of processing by the selected signal processing circuit.

2. The light detecting IC of claim 1 wherein said input terminal means has a pair of input terminals and said second signal processing circuit comprises a differentiating circuit for producing a differential signal from signals received through said pair of input terminals and a comparing circuit for comparing the level of said differential signal with a specified threshold value.

3. The light detecting IC of claim 2 which is connected to a divided photodiode having two elements, each of said pair of input terminals being connected to a corresponding one of said two elements of said divided photodiode.

4. The light detecting IC of claim 2 wherein said single light receiving element has a smaller light receiving surface, wherein one of said pair of input terminals is connected to another light receiving element which has a larger light receiving surface than said single light receiving element, the other of said pair of input terminals being grounded.

5. The light detecting IC of claim 1 wherein said first and second signal processing circuits are both connected to a single output circuit for outputting results of signal processing by said first and second signal processing circuits.

6. The light detecting IC of claim 2 wherein said first and second signal processing circuits are both connected to a single output circuit for outputting results of signal processing by said first and second signal processing circuits.

7. The light detecting IC of claim 3 wherein said first and second signal processing circuits are both connected to a single output circuit for outputting results of signal processing by said first and second signal processing circuits.

8. The light detecting IC of claim 4 wherein said first and second signal processing circuits are both connected to a single output circuit for outputting results of signal processing by said first and second signal processing circuits.

9. A light detector comprising a light detecting IC having a pair of input terminals and a divided photodiode having two elements each connectable to a corresponding one of said pair of input terminals, said light detecting IC including:
- a single light receiving element;
- a first signal processing circuit for processing signals outputted from said light receiving element;
- a second signal processing circuit for processing signals received through said input terminals; and
- a switch means for selecting one from said first and second signal processing circuits and outputting results of processing by the selected signal processing circuit.

10. The light detector of claim 9 wherein said two elements of said divided photodiode are connected to said pair of input terminals.

11. The light detector of claim 9 farther comprising another light receiving element which has a larger light receiving surface than said single light receiving element of said light detecting IC, said another light receiving element being connected to one of said pair of input terminals.

12. The light detecting IC of claim 2 wherein said pair of input terminals is connected to a position sensitive device.

13. The light detecting IC of claim 12 wherein said first and second signal processing circuits are both connected to a single output circuit for outputting results of signal processing by said first and second signal processing circuits.

14. A light detector comprising a light detecting IC having a pair of input terminals and an externally attachable light receiving element connected to one of said pair of input terminals, the other of said pair of input terminals being grounded, said light detecting IC including:
- a single light receiving element having a smaller light receiving surface than said externally attachable light receiving element;
- a first signal processing circuit for processing signals outputted from said light receiving element;
- a second signal processing circuit for processing signals received through said input terminals; and
- a switch means for selecting one from said first and second signal processing circuits and outputting results of processing by the selected signal processing circuit.

* * * * *